Nov. 14, 1939.  H. BOURG, SR  2,179,584
SUGARCANE HARVESTER
Filed Nov. 14, 1938   3 Sheets-Sheet 2
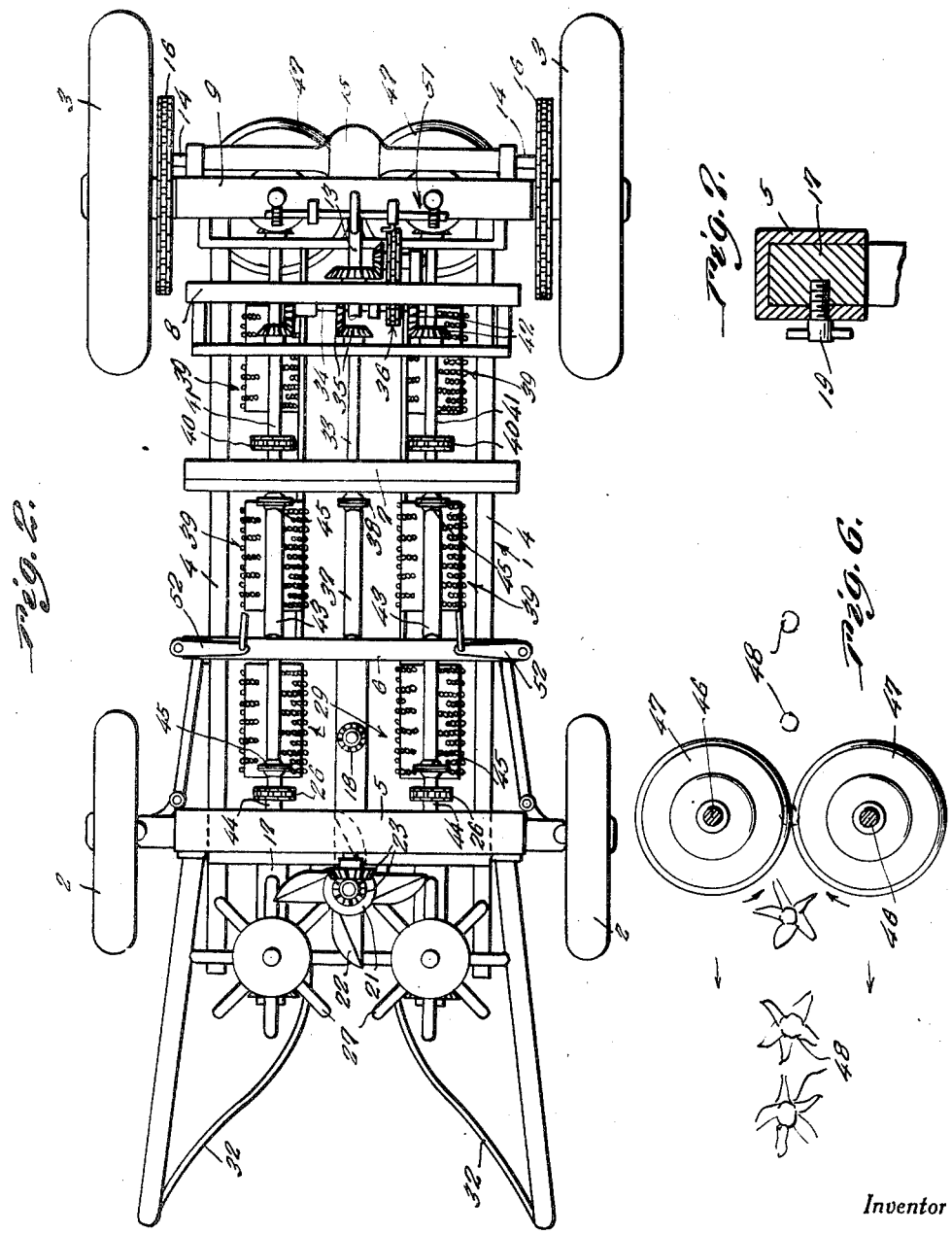
Inventor
Hamilton Bourg, Sr.
By Clarence A. O'Brien
and Hyman Berman
Attorneys Nov. 14, 1939.   H. BOURG, SR   2,179,584
SUGARCANE HARVESTER
Filed Nov. 14, 1938   3 Sheets-Sheet 3
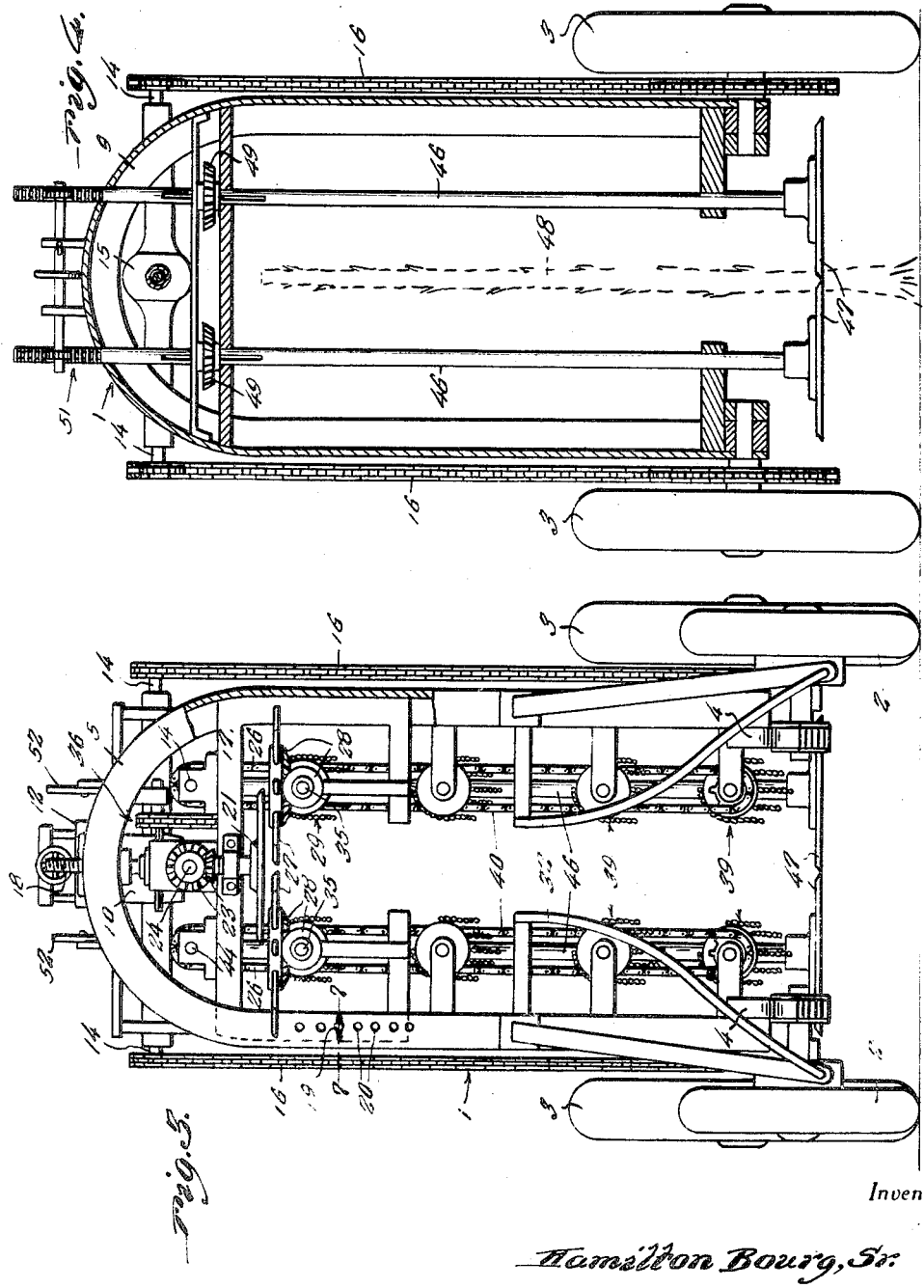
Inventor
Hamilton Bourg, Sr.
By Clarence A. O'Brien
and Hyman Berman
Attorneys Patented Nov. 14, 1939

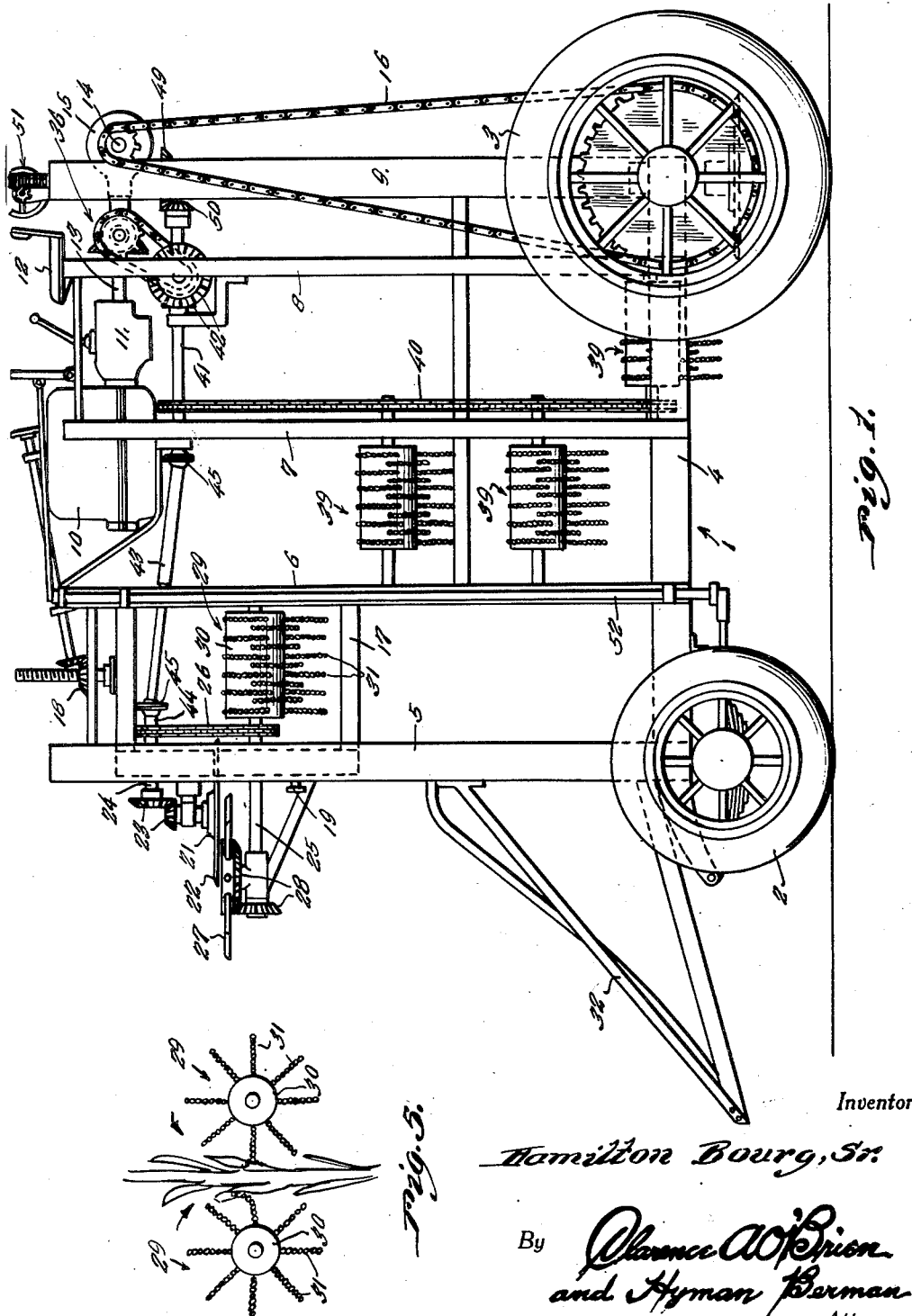

2,179,584

UNITED STATES PATENT OFFICE 2,179,584

SUGARCANE HARVESTER

Hamilton Bourg, Sr., Matthews, La.

Application November 14, 1938, Serial No. 240,390

1 Claim. (Cl. 56—17)

The present invention relates to new and useful improvements in sugarcane harvesters and has for its primary object to provide, in a manner as hereinafter set forth, a self-propelled machine of this character which is adapted to straddle the rows of cane and head, strip and then cut the stalks as it passes thereover.

Another very important object of the invention is to provide a sugarcane harvester of the aforementioned character embodying a novel construction and arrangement whereby the heading and cutting knives, together with certain of the strippers may be conveniently adjusted vertically to meet various conditions.

Still another very important object of the invention is to provide a sugarcane harvester of the character described wherein the machine itself is propelled and the knives, strippers, rotary collectors, etc., are driven from a single source of power under the control of an operator.

Other objects of the invention are to provide a sugarcane harvester of the character set forth which will be comparatively simple in construction, strong, durable, highly efficient and reliable in use, compact, light in weight and which may be manufactured and operated at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of a sugarcane harvester constructed in accordance with the present invention.

Figure 2 is a top plan view thereof with parts omitted.

Figure 3 is a view in front elevation of the machine.

Figure 4 is a cross sectional view, taken through the rear end portion of the machine.

Figure 5 is an elevational view, illustrating the action of the rotary strippers.

Figure 6 is a plan view, illustrating the operation of the vertically adjustable cutting knives, showing the shafts on which said knives are mounted in horizontal section.

Figure 7 is a view in horizontal section, taken substantially on the line 7—7 of Fig. 3.

Referring now to the drawings in detail, it will be seen that the embodiment of the invention which has been illustrated comprises a frame designated generally by the reference numeral 1, said frame being mounted on rubber tired front and rear wheels 2 and 3, respectively. The frame 1 includes longitudinal side bars 4 of channel iron having mounted thereon U members 5, 6, 7, 8 and 9, also of channel iron. Mounted on the upper portion of the frame structure 1, at an intermediate point, is an internal combustion engine 10 which is provided with a transmission 11. An operator's seat 12 is mounted adjacent the transmission 11. A drive shaft 13 from the transmission 11 actuates transverse shafts 14 on the rear member 9 of the frame structure 1 through a differential 15. The rear wheels 3 are connected to the shafts 14 for propelling the machine through the medium of chain and sprocket connections 16.

Mounted for vertical sliding adjustment in the upper portions of the front members 5 and 6 of the frame structure 1 is a carriage 17. The carriage 17 is raised and lowered as desired through the medium of a suitable screw and gear mechanism 18 on the upper portion of the frame structure 1 which is manually operable from the seat 12 of the machine. As shown to advantage in Figs. 3 and 7 of the drawings, the carriage 17 is releasably secured in adjusted position through the medium of a thumb screw 19 which is removably mounted in one of the uprights of said carriage, said thumb screw being engageable selectively in a series of spaced openings 20 which are provided therefor in the front member 5 of the frame structure 1. Thus, the carriage 17 is positively prevented from getting out of adjusted position through vibration, etc.

Mounted for rotation in a horizontal plane on the front of the carriage 17 is a heading knife 21 comprising a plurality of blades 22. Bevelled gears 23 drive the knife 21 from a longitudinal shaft 24 on the carriage 17. Also mounted longitudinally on the carriage 17 is a pair of spaced, parallel shafts 25. Rotary collectors 27 are mounted above the forward end portions of the shafts 25 forwardly of the blades 21 and driven through bevelled gears 28 from said shafts 25. Mounted on the rear portions of the shafts 25 is a pair of strippers which are designated generally by the reference numeral 29. Each stripper 29 includes a cylinder 30 having mounted thereon a plurality of beaters in the form of chains 31. Guides 32 project forwardly, outwardly and downwardly from the front of the frame structure 1 for picking up leaning stalks and directing them to the rotary collectors 27 and the heading knife 21.

Journalled longitudinally in the upper portion of the frame structure 1, beneath the power plant 10, is a shaft 33. As best seen in Fig. 2 of the drawings, the shaft 33 is driven from a transverse shaft 34 on the frame structure 1 through bevelled gears 35. The shaft 34, in turn, is driven from the main drive shaft 13 through a chain, sprocket and gear connection 36. A telescopic shaft 37 connects the shaft 24 to the shaft 33 for actuation thereby, universal joints 38 being provided between said shaft 37 and the shafts 24 and 33. Mounted in fixed positions on the lower intermediate portions of the frame structure 1 are pairs of coacting strippers 39. The strippers 39 are similar in construction and operation to the strippers 29. Chain and sprocket connections 40 drive the strippers 39 from longitudinal shafts 41 on the upper portion of the frame structure 1. Bevelled gears 42 drive the shafts 41 from the ends of the shafts 34. Telescopic shafts 43 connect the shafts 41 to comparatively short shafts 44 on the vertically adjustable carriage 17, universal joints 45 being provided on the ends of said shafts 43. The shafts 25 on the carriage 17 are driven from the shafts 44 by chain and sprocket connections 26.

Mounted for vertical sliding adjustment in the rear member 9 of the frame structure 1 is a pair of shafts 46. These shafts are shown to advantage in Fig. 4 of the drawings. Coacting disc knives 47 are fixed on the lower end portions of the shafts 46 for cutting the cane stalks, as at 48, adjacent the ground. Bevelled gears 49 are splined on upper portions of the shafts 46. Bevelled gears 50 on the rear end portions of the shafts 41 mesh with the gears 49. A manually operable adjusting mechanism designated generaly by the reference numeral 51 and operable from the seat 12 of the machine is provided for raising and lowering the shafts 46 with the cutting knives 47 thereon.

Briefly, the operation of the machine is substantially as follows:

As the machine travels over the rows of sugarcane the stalks are straightened up by the guides 32 and directed to the collectors 27, as hereinbefore recited. The rotating collectors 27 convey the stalks to the knife 21 where said stalks are headed by the blades 22. The flexible beaters 31 of the strippers 29, being swung outwardly by centrifugal force, then engage and remove the leaves from the upper portions of the headed stalks, as suggested in Fig. 5 of the drawings. Through the medium of the adjusting mechanism 18, operable from the seat 12 of the machine, the heading knife 21, the collectors 27, the front strippers 29, etc., may be raised and lowered as desired. As the machine moves forwardly the strippers 39, functioning in the same manner as the strippers 29, remove the rest of the leaves from the lower portions of the stalks. The stalks are then cut off by the coacting disc knives 47. A suitable steering apparatus 52, operable from the seat 12, is connected to each of the front wheels 2 for steering the machine.

It is believed that the many advantages of a sugarcane harvester constructed in accordance with the present invention will be readily understood and although a preferred embodiment of the machine is as illustrated and described, it is to be understood that changes in the details of construction and in the combination and arrangement of parts may be resorted to which will fall within the scope of the invention as claimed.

What is claimed is:

A sugarcane harvesting machine comprising a wheel supported frame structure including an upstanding, substantially U-shaped channel member, a vertically movable carriage slidably mounted in the channel member, the leg portions of said channel member constituting guides for the carriage, means for manually raising and lowering said carriage, a heading knife rotatably mounted on the carriage, a pair of collectors rotatably mounted on the carriage for directing the cane stalks to the heading knife, a plurality of strippers rotatably mounted on the carriage, and common actuating means for the heading knife, the collectors and the strippers mounted on the frame structure.

HAMILTON BOURG, Sr.